April 5, 1966 R. L. PLOUFFE ETAL 3,245,033

CODE RECOGNITION SYSTEM

Filed March 24, 1960 3 Sheets-Sheet 1

INVENTORS.
ROBERT L. PLOUFFE
BY STANLEY M. SCHREINER

ATTORNEY

CODE RECOGNITION SYSTEM

Filed March 24, 1960

3 Sheets-Sheet 2

INVENTORS.
ROBERT L. PLOUFFE
BY STANLEY M. SCHREINER
ATTORNEY

April 5, 1966 R. L. PLOUFFE ETAL 3,245,033

CODE RECOGNITION SYSTEM

Filed March 24, 1960 3 Sheets-Sheet 3

INVENTORS.
ROBERT L. PLOUFFE
BY STANLEY M. SCHREINER

ATTORNEY

United States Patent Office 3,245,033

Patented Apr. 5, 1966

3,245,033
CODE RECOGNITION SYSTEM

Robert L. Plouffe, Livingston, and Stanley M. Schreiner, Nutley, N.J., assignors to International Telephone and Telegraph Corporation, Nutley, N.J., a corporation of Maryland Filed Mar. 24, 1960, Ser. No. 17,376
22 Claims. (Cl. 340—146.1)

Figure 1:
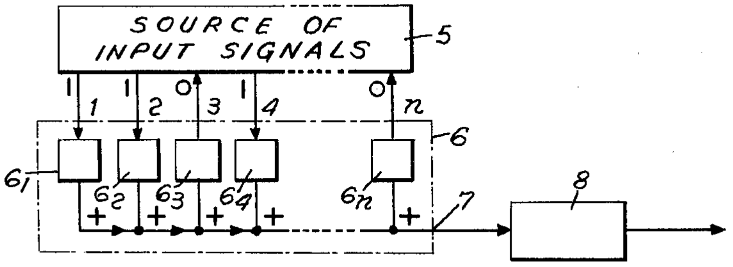

This invention relates to code systems, and in particular to a system for detecting and correcting errors which impair the accuracy of the output information of such systems.

The invention is related but not restricted in its practical application primarily to systems employing binary permutation codes. A binary permutation code consists of a numerical sequence of any number of 0's or 1's in any permutation arrangement. Any individual element of such a code, therefore, consists of a "0" or "1" and the arrangement of the individual elements is termed a code group. Separate code groups are used to represent symbols, which are defined herein as code characters. The binary elements (1 and 0) may be distinguished from each other in practical systems by signaling conditions such as current or no current, positive current and negative current or any other suitable selected pairs of conditions including inter alia, those on a time, frequency or amplitude basis. In embodying code groups in the form of signal combinations, it is possible for at least one or more of the aforesaid signaling conditions to be in error. A single error (i.e. an error in one signaling condition) would cause the total value of the transmitted code character to be in error.

The prior art offers systems and methods of checking the accuracy of received or recorded permutation codes, and these can be generally considered in two classes. The first class consists of those arrangements wherein errors are detected but not corrected. One known type system within this class adds two additional elements to the five unit standard binary permutation code groups for the purpose of checking accuracy. In such systems the permutations usable for information may consist of those having, for example, exactly four of one type binary element (i.e. four 1's) per code group of seven binary elements transmitted, and in such arrangement the receipt of a permutation or code group having other than four 1's indicates some kind of error. The principle involved in thus checking the accuracy of encoded received information may be extended to codes consisting of any practical number of elements. For instance, there are systems which employ so-called two-out-of-five codes. These are five-element binary permutation code systems in which but ten of the thirty-two possible permutations are used, these being ten in which there are exactly two of one type signaling condition. Upon the occurrence of a single error in the receipt or recordation of a code group of such a system it is detected by the fact that more or less than two of the one type signaling condition result in the code group.

The disadvantage with the first class of prior art which detects, but does not automatically correct errors, is that it becomes necessary to provide an alarm signal to the transmitter so that the incorrectly received portion of the information may be retransmitted.

A second class of prior art consists of those arrangements wherein errors are corrected as well as detected. In general, error correction requires a greater number of code checking elements to be transmitted with the informational elements than are necessary for mere detection. To be error-correcting, a binary code must be such that at least three changes in the code element combination must be made when changing from the representation of one character to the representation of any other character. The difference in the code elements is known as minimum geometrical distance, and will be discussed more fully hereinbelow. In a code with at least a minimal geometrical distance of three, a single error will produce a code combination that can be recognized to contain an error, and the individual element in error can be determined. The prior art thus far has included correction schemes which find and correct the incorrect element either by the method of changing the code elements one at a time and observing when a code combination is obtained that is a correct representation of a code character, or a more automatic method which involves transmitting the check alements in selected permutation with the information elements so that certain selected sub-permutations of the code group will be in even or odd parity as desired. For an explanation of the terms "even and odd parity" and for a system as described above, reference is had to U.S. Patent Reissue 23,601, reissued December 23, 1952, to Hamming and Holbrook, for an Error-Detecting and Correcting System. A logic circuit is then necessary to determine if the sub-groups are in parity. If certain sub-groups are not in parity, the logic circuit is capable of locating the element in error and feeding-back a correction for that element.

The methods of correcting element errors heretofore necessarily involved a determination of the error location followed by a changing of the element in error. These methods require extensive additional equipment over and above that necessary for code transmission, such equipment including parity circuits, or means for checking sub-groups of the code elements, together with relay circuits for determining the location of the element in error within the code group.

The present invention advances the present state of the art by providing a correction system which will automatically correct for errors in the elements of a code group, but which does not include the problem of parity checking or the need for the insertion of a correction for the element in error. In accordance with the present invention, error correction systems are advanced to a point wherein an erroneous code group is received, and an output signal is produced representative of the code character which was intended to be transmitted were the code group not erroneous. It is not necessary to locate and correct the error, since a correct result will be obtained despite the error.

An object of the present invention is to provide an improved code recognition system responsive to a selected number of code groups out of a greater number of possible code groups, particularly one of simplified construction.

Another object of the present invention is to provide an error handling system wherein a correct output signal is obtained from an erroneous input signal without requiring the error to be located or corrected.

A feature of the present invention is the provision of a code recognition system comprising a source of a plurality of discrete input signals wherein each input signal is characterized by any one of a plurality of possible signaling conditions such that at any one time the signaling conditions of said plurality of input signals are representative of any single one of a plurality of code groups, and means responsive to said input signals to produce an output signal for a given one of said code groups, and for all other groups of said input signals distinct from said given code group by a predetermined number of said signaling conditions.

Another feature of the present invention is the provision of a code recognition system of the type described wherein the means responsive includes a single one or more magnetic core devices each responsive to one of said code groups.

The above mentioned and other features and objects of this invention will become more apparent by reference to the following description taken in conjunction with the accompanying drawings, in which:

FIG. 1 is a block diagram of an embodiment of a code recognition system following the principles of this invention; and FIGS. 2, 3, 4 and 5 are schematic diagrams illustrating different embodiments of a code recognition system following the principles of this invention.

Before specifically discussing the illustrated embodiments, it will be advantageous to provide an analysis of the self-detecting and correcting codes used in this invention. The binary code will be used as the basis for the analysis, and the binary elements 1 and 0 will be used to mathematically represent the many possible physical code conditions, such as open and closed relays or positive and negative flux, etc.

In a binary code using $n$ elements there are $2^n$ possible combinations of elements (code groups) which will be distinct from each other by one element, and $2^n$ different meanings could be assigned to the different possible code groups. However, if a code of length $n$ were to contain $2^n$ code characters, a single error in a code group would produce another code group which would necessarily represent another code character. To correct a single error, a code must be such that at least three changes in the element combination must be made when changing the representation from one single numerical value (character) to another. To correct a double error or above, a greater number of changes in the element combination must be made, and the number of changes necessary for correcting an error between characters in any code has been defined as "minimum geometrical distance." The term "geometrical distance" as used in this content dealing with codes means the number of element changes which are exhibited by one code group in respect to another code group. "Minimum geometrical distance" as used, means the minimum amount of element changes which must exist between code characters for error correction purposes. To be error correcting, a binary code using $n$ elements must have $k$ redundant elements to provide minimum geometrical distance, so only $n-k=m$ elements remain to convey information. Therefore, out of a possible $2^n$ code groups, only $2^m$ of those groups will represent code characters, e.g. in a 7 element code there are $2^7=128$ possible code groups, but since 3 redundant elements is necessary to insure single error correction, only $7-3=4$ elements can be used for information with the result that only $2^4=16$ characters are possible with a 7 element code.

By decreasing the "minimum geometrical distance" by using a lesser amount of element changes (i.e. lesser distance) a code may be made error *detecting* but not error *correcting*, while by increasing the geometrical distance, double error correcting and still more powerful schemes may be derived. The general expression for determining the property of a code is stated thus: if distance $d$ is an odd number it is possible to correct $(d-1)/2$ errors or detect $(d+1)/2$ errors and if distance $d$ is an even number it is possible to correct $d/2-1$ errors and detect $d/2$ errors. The properties of one type code as a function of element changes are known to be as set forth in Table I:

*Table I*

| Changes between code elements (geometrical distance): | Property of code |
|---|---|
| 1 | No error detecting or correcting. |
| 2 | Single error detecting. |
| 3 | Double error detecting or single error correcting. |
| 4 | Double error detecting with single error correcting or triple error detecting. |
| 5 | Double error correcting or triple error detecting with single error correcting or quadruple error detecting. |

For single error correction the number of redundant elements necessary with $m$ information elements is fixed. It is known that the number of $k$ redundant elements necessary for $m$ information elements follows the relationships set forth in Table II:

*Table II*

| $n$ | $m$ | $k$ |
|---|---|---|
| 1 | 0 | 1 |
| 2 | 0 | 2 |
| 3 | 1 | 2 |
| 4 | 1 | 3 |
| 5 | 2 | 3 |
| 6 | 3 | 3 |
| 7 | 4 | 3 |
| 8 | 4 | 4 |
| 9 | 5 | 4 |
| 10 | 6 | 4 |
| 11 | 7 | 4 |
| 12 | 8 | 4 |
| 13 | 9 | 4 |
| 14 | 10 | 4 |
| 15 | 11 | 4 |
| 16 | 11 | 5 |

It is to be noted that for codes having capability of multiple error correction no such simple tables exist, although the minimum number of redundant elements has been determined empirically for relatively short block lengths (i.e twenty and below).

In prior art systems of error location and correction, it is necessary that the $k$ redundant elements be located in particular sequence with the $m$ information elements within the code group. The positions assigned to the $k$ elements had to be predetermined in accordance with the required parity check. Such prior art systems include that described by Hamming and Holbrook in U.S. Patent Reissue 23,601 and the more general classes of codes described by Slepian on page 203 of the Bell System Technical Journal, January 1956, in his article entitled "A Class of Binary Signaling Alphabets," wherein complete error correcting codes are set forth which were found to be the "best" codes for given values of $n$. The present invention does not require parity checking, so it enjoys the advantage of being able to position the redundant and information elements in any arrangement desired, which means that the present invention is capable of being used not only with the codes described by Hamming-Holbrook and Slepian, but with any block code input having the required distance for error correction.

Referring to FIG. 1, a source 5 of $n$ signals is shown wherein each signal represents a binary element of a given code character of an error correcting code having a total of $n$ elements including $m$ information elements and $k$ redundant elements such that the binary elements (1, 0) are represented by one or the other of two possible signaling conditions such as positive and negative current.

A means 6 is provided responsive to the signals of source 5 to produce a predetermined output signal when a code group representing a given code character is presented. Means 6 includes $n$ component $6_1$, $6_2$, $6_3$, $6_4$, . . . $6_n$ (to be described hereinafter) each of the $n$ components being responsive to one of the $n$ signals and so arranged that each component provides a first type signal (positive as an example) when the corresponding binary elements is correctly represented in accordance with the given code character, and an opposite signal (i.e. negative) when the binary element is in error. When the $n$ elements of the given code character are all correctly represented, the total analog output signal of said responsive means 6 will be $n$ units of positive signal and will appear on output conductor 7. In the event of a single error in one of the elements of the given code character, the signaling condition representing the element in error will change to the other of the two possible conditions, and the associated component will produce a unit of negative signal. The total output of those $n$ components responsive to the correctly represented elements will now be $n-1$ units of positive signal, in addition to one unit of negative signal from the component associated with the element in error and will result in a total output signal on conductor 7 of $n-2$ units of positive signal. Now, if the signaling conditions of the signals of source 5 were changed to represent any of the other possible $2^m$ code characters, the results obtained from responsive means 6 would be distinctly different. Since, for correcting a single error, each of the other code characters must different from the aforesaid given code character in at least three elements, any of the other possible code characters if applied to means responsive 6 would produce $n-3$ units of positive signal and three units of negative signal for a total of $n-6$ units of positive signal at most. The code characters which differ from the aforesaid given code character by a geometrical distance greater than three would necessarily produce an even less positive total output signal. If the nearest code character (i.e. distance of three) now exhibits a single error, then depending on whether it appears as a 1 or a 0, the distance from the given code character will either increase or decrease. It is the error which causes a decreased distance which is of concern, and it can be seen that such error will cause responsive means 6 to produce $n-2$ units of positive signal and two units of negative signal for a total of $n-4$ units of positive signal at most.

Given a responsive means 6 of the type described, which is arranged to respond to a particular given code character of a single error correction code, it is seen that the occurrence of the given code character will produce an $n$ unit analog output signal, a single error in the given code character will produce an $n-2$ unit analog output signal, and that any other code character, either correct or in error, will produce, at the very most, an $n-4$ unit analog output signal. By now providing a means 8 to determine which output signals are above or equal to the value of $n-2$ units, it is possible to detect a given code character even when the code group representing the given code character exhibits a single error, and to reject all other code groups which produce an analog output signal below the value of $n-2$ units.

An even more general statement of the relationship which will hold true for all values of $n$ is that the given code character, either correct or with at most $(d-1)/2$ errors will produce at least $n-d+1$ units of output signal (where $d$ represents geometrical distance as above defined) and any other code character, either correct or in error, will produce, at most, $n-d-1$ units of output signal.

A further feature of the present invention as embodied in FIG. 1 is that a complete absence of an output signal at means 8 upon the occurrence of an input code group from source 5 indicates the presence of a double error. If the code distance is increased to 4 (minimum distance) for single error correction and double error detection) a single error in the desired input code group will cause responsive means 6 to produce, at most, an $n-2$ unit analog output signal as above while a double error in the desired input code group will cause responsive means 6 to produce, at most, an $n-4$ unit analog output signal. As before, it will be seen that any other code group with distance 4 will produce, at most, $n-8$ units of output signal. Such code group with a single error will produce $n-6$ units of output signal and with a double error $n-4$ units of output signal. Since means 8 responds only to output signals equal to or above the value of $n-2$ units, no output will be produced from means 8, indicating a double error. The present invention includes, therefore, the features of error correction and error detection, the error correction being accomplished by the inherent principle of the invention and the error detector accomplished by the fact that zero output indicates the presence of an error of a higher order than the error correction capabilities of the structure. Reference to Table II will indicate the extent of error detection possible with codes of increasing geometrical distance.

The above discussion concerned an $n$ element binary code containing $m$ information elements and $k$ redundant elements, and a means responsive to only one of the possible $2^m$ code characters. If the code signals were applied simultaneously to $2^m$ of said responsive means 6 and each one of the means 6 was arranged to respond to a different one of the $2^m$ possible code characters, then a complete system for decoding an error correcting binary code would result. As an example, assume an error-correcting binary code having 7 elements. Given a required distance of 3 (minimum geometrical distance for single error correction), it will then be necessary to provide $k$ redundant signals, in this case three, leaving only 4 elements that can be used for information. As was shown before, out of the 128 possible code groups in this instance only 16 combinations can represent code characters. The $n$ code signals are applied to 16 separate responsive means 6, each means designed to respond to a different code character. Each means, as shown hereinabove, will also respond to its associated code character even in the event of a single error in any one of the 7 elements, so each means can then be said to respond to 8 code groups of the total 128 possible code groups, those 8 code groups being the given code character and the other 7 code groups formed by separately changing each element in the given code character. Since there are 16 separate arrangements of responsive means, each responding to a different 8 code group, the total 128 possible code groups are accounted for.

A specific embodiment of a code recognition system including an example of one responsive means of the type described will now be discussed.

Figure 2:
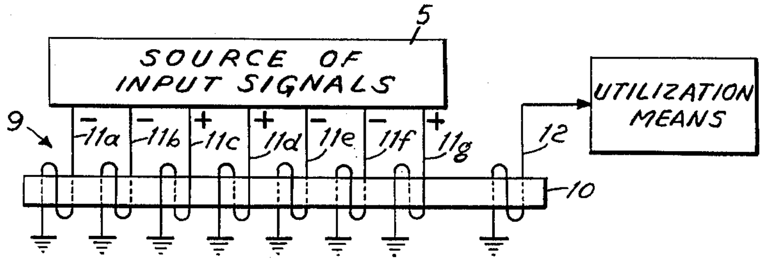

Referring to FIG. 2, a code recognition system is shown comprising a source of a plurality of discrete input signals 5 wherein each input signal is characterized by any one of a plurality of possible signal conditions such that at any one time the signaling conditions of said plurality of input signals are representative of any one of a plurality of code groups, and means 9 responsive to said input signals to produce an output signal for a given one of said code groups, and for all other groups of said input signals distinct from said given code group by a predetermined number of said signaling conditions.

The means 9 in accordance with the above discussion responds to each of the $n$ code signals so as to provide a first type signal for each code element code when said code element is correctly represented and an opposite type signal when said element is in error, and further provides an output representative of the totality of said signals. Following these principles means 9 includes a magnetic core 10 and a plurality of conductors **11*a* to 11*g* wound thereon, each conductor coupled to source of input signal 5 and responsive to a different one of the $n$ input signals. For purposes of explanation $n$ has been chosen as seven, and consequently, seven conductors are shown. Of the seven input signals, four convey binary information and three are the redundant signals necessary for a geometrical distance of three. The relative positions of the information and redundant conductors are immaterial, so conductors 11$a$ to 11$c$ have been arbitrarily shown as carrying redundant signals and conductors 11$d$ to 11$g$ as carrying information signals. Also for illustration, the code has been shown as binary, with a positive input signal representing a binary element "1" and a negative input signal as representing a binary element "0." The signal polarities as shown on conductors 11$a$ to 11$g$ represent a correct code character of the numerical value "nine" in the error correcting code. The windings on magnetic cores 10 have correspondingly been arranged to respond to code character "nine." Magnetic core 10 may be constructed from ferrite or Permalloy materials, and it would be desirable for core 10** to exhibit a substantially rectangular hysteresis characteristic so that if it is set in a positively or negatively magnetized condition upon the application of appropriate signal current a nearly constant flux change is obtained when the signal current is reversed.

Since conductor 11$a$ has been wound counterclockwise upon core 10, the negative signal applied to conductor 11$a$ will cause a given unit of flux to be directed toward the right in accordance with the right-hand rule. Henceforth, flux directed toward the right will be considered positive flux and flux directed toward the left will be considered negative flux. The negative signal applied to counterclockwise winding 11$b$ will produce another unit of positive flux, and the positive signal applied to clockwise winding 11$c$ will add a third unit of positive flux until it can be seen that ultimately a total of seven units of positive flux will be produced. Consider now the occurrence of an error in a single element of the input signal code group. The polarity of the signal upon the conductor related to the particular element in error will be reversed, so that no matter which one of the conductors is concerned, there will only be six units of positive flux produced in core 10. The signal which is in error, now being of opposite polarity, will produce a unit of negative flux, so that the total flux produced in core 10 will be five units of positive polarity.

If any other of the sixteen possible code characters were to be transmitted from input source 5, they would, by definition, necessarily have to differ from code character "nine" by at least three elements. Therefore, the polarity of three of the seven signals shown on the conductors in FIG. 2 would be reversed. No matter which three conductors are concerned, the result on core 10 would be the production of only four units of positive flux and three units of negative flux, for a total flux of one unit of positive polarity. For those code characters which differ from character "nine" by a distance greater than three, the total flux produced would be even less positive.

In the event of an error in one of the elements of the code characters which differ from character "nine" by a distance of three, the result will be a new code group which differs from character "nine" by either four elements or two elements depending on which of the particular elements are in error. If the difference is four elements, it is obvious that the distance from the character "nine" has been widened, and the total flux produced by the erroneous code character on core 10 will be less than one positive unit. If the error occurs in one of those elements of the character which causes the difference to be two elements, then the polarities on only two of the conductors of FIG. 2 would be reversed. The result in core 10 would then be five units of positive flux and two units of negative flux, for a total flux of three positive units.

Stating the above concisely: core 10 will produce *at least* $n-d+1$, or five units of positive flux upon the occurrence of a given code character, even in the event of a single error, and at least $n-d-1$, or three units of positive flux for any other possible code group. It is to be noted that "any other possible code group" necessarily must be one of the other fifteen code characters, either appearing correctly, or with any of $n$ possible single errors.

An output winding 12 is also provided on core 10, so that a useful indication can be obtained. Output signals on winding 12 due to the occurrence of code character "nine," either correct or with a single error, will be of an amplitude proportional to five or more positive flux units, and those output signals due to the occurrence of any other code group will be of a lesser amplitude, proportional to three or less positive flux units. A utilization device 12$a$ (such as a threshold amplifier) may be coupled to winding 12, responsive to the higher amplitude signals resulting from five or more flux units to usefully employ the decoded character "nine" information. It is to be noted that, having a flux discrimination between code character "nine" and all other code groups, as described, various other methods of sensing the discrimination may be suggested. For example, core 10 could be biased at flux of negative four units, which is equal to $n-d$ so that the desired output $n-d+1$ will appear positive and all the other outputs $n-d-1$ will appear negative. This method will be illustrated in a later embodiment. Means 9 was illustrated as a magnetic core device, but it is to be understood that such bistable devices such as relays, multivibrators or bistable amplifiers could also be employed.

Following the principles employed in FIG. 2 for decoding the code character "nine" an arrangement may be provided to decode any of the possible code characters of an $n$ element error-correcting permutation code.

Figure 3:
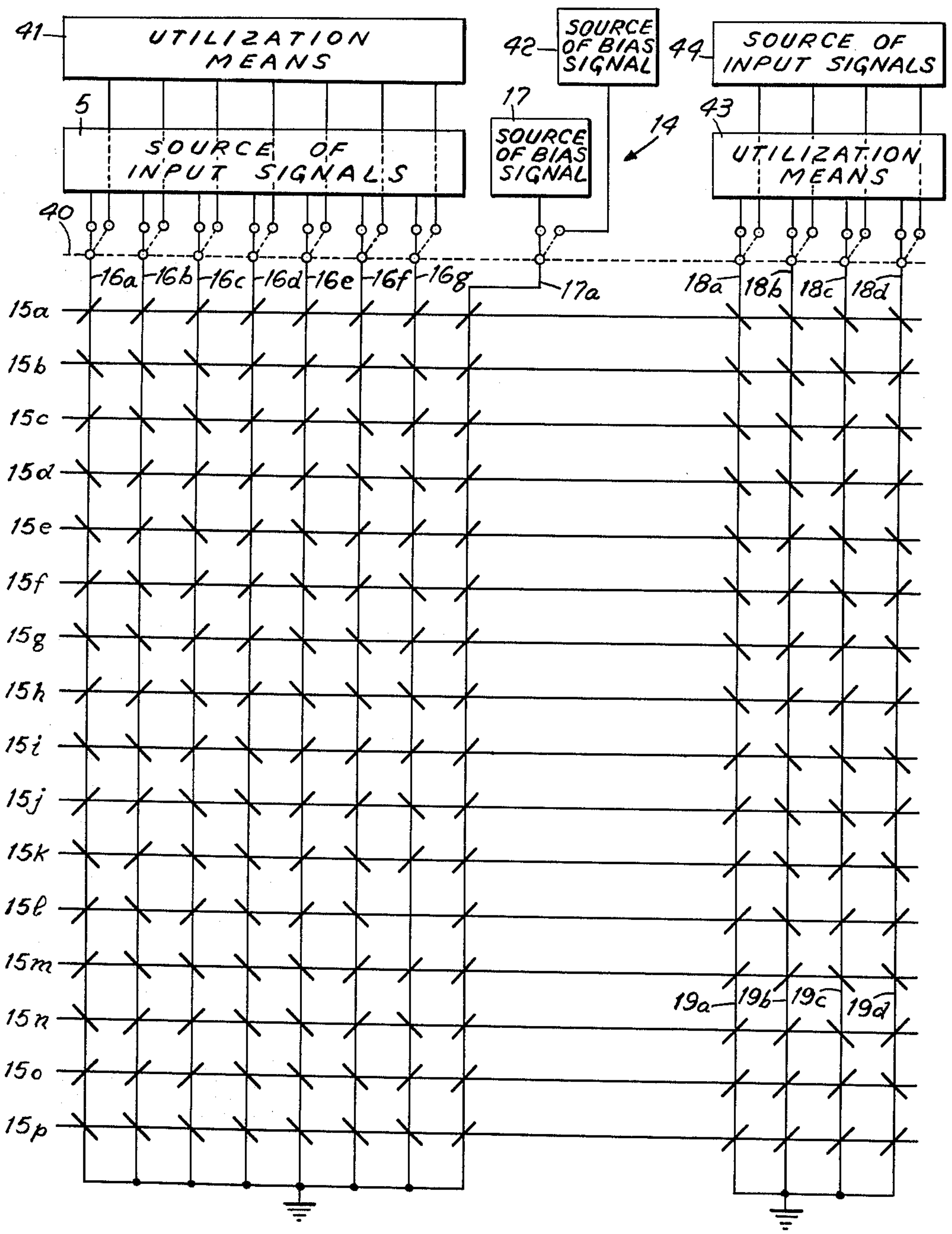
Figure 5:
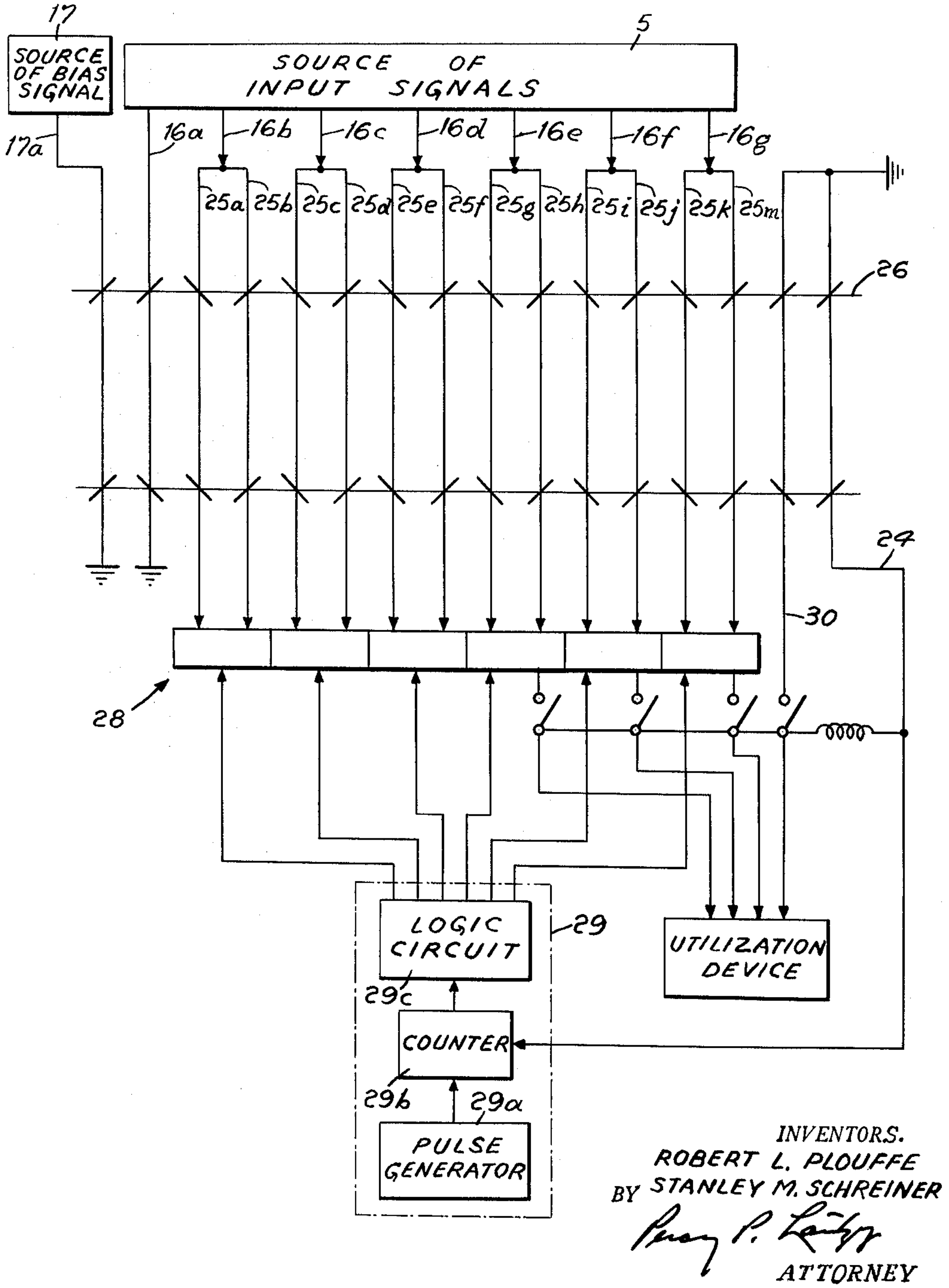

Referring to FIG. 3, a source of discrete input signals 5 identical to that described in FIG. 2 is shown with means 13 responsive to said input signals to produce a plurality of output signals, each one representative of a separate one of the possible code characters, and means 14 to cooperate with means responsive 13 to select the one of said output signals representative of a given code character upon the occurrence of said given code character and all code groups differing from said given code character by a single element.

More specifically, means responsive 13 includes an arrangement of magnetic cores 15$a$, 15$b$ . . . 15$p$, each similar to core 10 of FIG. 2 with the exception that each core is wound to correspond with a different one of all the possible code characters. In order to simplify the drawing, a magnetic core is diagrammatically shown as a thick, generally horizontal, straight line, and a winding on the core is represented as a short inclined line, and the direction of slope of the short line indicates the direction of winding. Thus in FIG. 3, the magnetic cores 15$a$ to 15$p$ have windings represented either by a short line inclined upwards to the left or a short line inclined upwards to the right. Vertical conductors 16$a$ to 16$g$, 17$a$, and 18$a$ to 18$d$ drawn through the intersections of windings indicate conductors with which the core windings are connected respectively in series. It will be assumed that the windings which slope upwards to the left, are wound clockwise when looking in from the left, and the windings which slope upwards to the right are wound counterclockwise: also that a current flowing downwards in the conductors produces a flux from left to right in the cores when the winding representations slope upwards to the left and from right to left in the cores when the winding representations slope upwards to the right. If current were to flow upwards in any of the conductors, the flux produced would be in the opposite direction. It will be understood, of course, that the cores can be toroidal in form, and not a straight rod as indicated in FIG. 3; and any core may have any number of separate windings, some of which may be wound "clockwise" and others "counterclockwise," and such windings may have any number of turns.

It was said that for purposes of explanation $n$ would be chosen as seven and so $m$ must be four. Therefore, $2^m$, or sixteen code characters are possible from the code, so that sixteen magnetic cores 15a, 15b . . . 15p are shown wound corresponding to binary code characters "zero" to "fifteen." Conductors 16a to 16g couple input source 5 to each of the magnetic cores 15a to 15p. Conductors 16a to 16c transmit redundant signals, and conductors 16d to 16g transmit information signals. Each of the conductors are wound on the cores in either clockwise or counterclockwise fashion depending on the particular elements of the code character represented by each core.

If any one of the code characters "zero" to "fifteen" were to be transmitted from source 5, the result would be a positive flux of seven units in the one corresponding core, and due to the fact that the cores are separated by a distance of three, each of the other cores would produce only one unit of positive flux at most.

If the code character transmitted from source 5 contains a single element error, the resultant flux of the corresponding magnetic core will be $n-d+1$, or five positive units, while the resultant flux from each one of the other cores will be, at most, $n-d-1$ or three positive units.

The above-mentioned means 14 for selecting code characters includes a source of bias 17 coupled to each one of cores 15a to 15p by means of winding 17a. Winding 17a is wound on each core in a counterclockwise manner, so that a positive current flow from source 17 will produce negative flux. The magnitude of the bias signal from source 17 is chosen so as to produce $n-d$ units of negative flux in each core, so that the output signal of the core corresponding to the transmitted code character, with or without a single error, will always appear positive, while the outputs of all the other cores will appear negative.

To determine the particular code elements it is, therefore, necessary to determine which core produces a positive total flux. Various techniques for this will readily occur. On the other hand, it may be desirable for certain computer purposes to recover the code representing a character in a form free of the error and free of the redundant signals which are no longer required, the error having been eliminated. Both these objectives may be realized by a code arrangement of output windings on the cores using the aforementioned positive flux present in the selected core to set up the code thus.

Four output conductors 18a to 18d are wound on cores 15a to 15p to correspond to the four information signals transmitted from source 5. Output conductors 18a to 18d are wound either clockwise or counterclockwise on selected ones of said cores, so that positive output flux from any one of cores 15a to 15p will result in positive and negative output signals being produced on selected ones of said output windings. As an example, assume code character "thirteen" has been transmitted by the input signals from source 5. Code character "thirteen" is represented by the binary permutation 1001101. Assume also that the signal on conductor 16e is in error, so that the binary permutation transmitted appears as 1001001. The input signals from source 5 and the bias signal from source 17 will cause one positive unit of flux to be produced from core 15n, and at most one negative unit of flux from any of the other cores. The positive unit of flux in core 15n will cause a positive output signal to be induced in windings 19a, 19b and 19d of conductors 18a, 18b and 18d and a negative output signal in winding 19c so that these positive and negative output signals will represent the binary permutation 1101 which corresponds to code character "thirteen."

In a like manner any possible code character, in this case "zero" to "fifteen," will produce a corresponding output signal from conductors 18a to 18d, whether or not the code character contains a single error.

Another useful feature of the embodiment illustrated in FIG. 3 is the fact that the circuit can be utilized to generate an error-correction code. This feature is related to the bilateral aspect of the core windings. The above discussion in regard to FIG. 3 related to the production of the basic binary code group for a related code character upon the reception of the error-correcting code group for that related code character, even in the event of a single error. FIG. 3 shows a ganged switch 40 which, when translated, disengages conductors 16a to 16g from source 5 and engages them to utilization means 41; conductor 17a is disengaged from bias source 17 and engages bias source 42; and conductors 18a to 18d are disengaged from utilization means 43 and engage a source of input signals 44. Source of input signals 44 produces positive and negative signals in conductors 18a to 18d depending on the binary code character being transmitted (i.e. to transmit code character "nine," the signals on conductors 18a, 18b, and 18d will be positive and the signal on conductor 18c will be negative). This will result in the production of flux directed toward the left in core 15n by core windings 19a to 19d, for a total flux in core 15n of four units ($n$) to the left. The total flux produced by the said signals of conductors 18a to 18d in any other core will be, at most, $n-2$ or two units to the left. Bias source 42 is designed to provide a negative signal which will produce three units of flux directed to the right in each of cores 15a to 15p, therefore, only the core related to the binary code character represented by the input signals from source 44 will contain positive flux (i.e. when code character "nine" is being transmitted core 15n will have one unit of positive flux and the remaining cores will have negative flux). The unit of positive flux in the related core will cause signals to be generated in the core windings coupled to conductors 16a to 16g. The signals on conductors 16a to 16g will be either positive or negative depending on the sense of the windings on the selected core. The positive and negative signals from the selected core will be transmitted by conductors 16a to 16g to utilization means 41 in the form of an error-correcting code group representative of the binary code character transmitted from source 44. However, due to the core windings, the conventional signaling conditions of the error-correcting code will be reversed. That is, a binary "1" will be represented by negative signal and a binary "0" will be represented by a positive signal.

Figure 4:
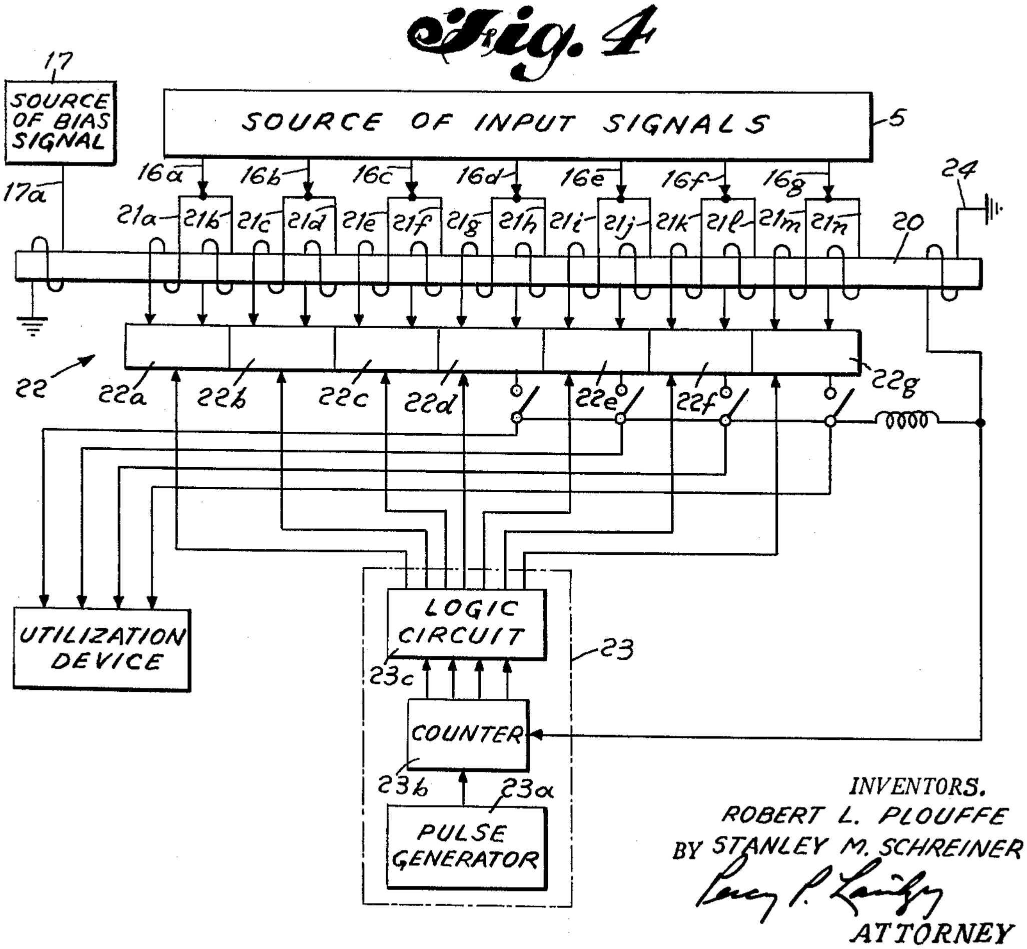

In the embodiment illustrated in FIG. 3 it was seen that for a seven element code sixteen code characters were possible and that sixteen magnetic cores were required. As the number of elements $n$ increases for long codes, the difficulty arises that the number of magnetic cores required increases exponentially. Referring to FIG. 4, an embodiment is shown wherein this difficulty can be overcome. A source of $n$ input signals 5 is shown which is identical to the source 5 shown in FIGS. 1, 2 and 3. For purposes of explanation $n$ will again equal seven. A group of conductors 16a to 16g are coupled to source 5, each conductor carrying a separate one of said input signals. Each of the conductors 16a to 16g is coupled to a single core 20 by a pair of parallel windings denoted as 21a to 21n. One winding of each pair is wound in a clockwise fashion and the other winding of each pair is wound in a counterclockwise fashion. Windings 21a to 21n terminate at a switching circuit 22 having $n$ bistable devices 22a to 22g. Each parallel pair of windings 21a to 21n are coupled to a separate bistable device of switching circuit 22. Each bistable device of switching circuit 22 controls each parallel pair of windings such that the input signal due to each element can flow through only one of the windings of each pair at any one time. More specifically, assume binary element "1" is transmitted from source 5 on conductor **16*a*. A positive flux is required, only the signal on winding 21*a* is desired. Bistable device 22*a* may include a double-pole single-throw switch capable of "making" one of the parallel winding circuits while "breaking" the other winding circuit. Therefore, bistable device 22*a*, when set for element "1," will "make" winding 21*a*, permitting positive signal to flow, while "breaking" winding 21*b* and thereby producing a positive unit of flux. It follows that if a negative signal, representative of binary element "0" is applied to windings 21*a* and 21*b* from source 5, then bistable device 22*a* should be set for element "0," which would require the "breaking" of winding 21*a* and the "making" of winding 21*b***, again producing a positive unit of flux.

If bistable device **22*a* were to be set for element "1" wherein winding 21*a* is "made" and winding 21*b* is broken, and the signal on conductor 16*a* from source 5 were to be negative, indicating element "0," then an error indicating unit of negative flux would be produced due to winding 21*a*. Likewise, if source 5 transmitted a "1" on conductor 16*a* and bistable device 22*a* was set for element "0," a unit of negative flux would be produced due to winding 21*b***.

In a like manner each bistable device of switching circuit 22 can be independently set to either one of the binary elements to form a code character. Driving circuit 23 is provided to cooperate with switching circuit 22 to cause switching circuit 22 to generate all the possible code characters, in this instance sixteen, at a high rate of speed. Driving circuit 23 includes pulse generator **23*a*, four stage binary counter 23*b*, and logic circuit 23*c*. Pulse generator 23*a* causes binary counter 23*b* to produce standard binary code signals "zero" to "fifteen." These code signals are fed to logic circuit 23*c* which with conventional gating techniques produces seven ($n$) output signals to control switching circuit 22 to generate the sixteen possible code characters in the error-correction code. If the rate at which all the code characters are generated is equal to or greater than the rate at which the code groups are received from source 5 the effect will be the same as having sixteen separate cores. Each input code group will be compared with each one of the possible code characters until a positive flux greater than five units is produced from the $n$ "made" windings, indicating that the code character represented by the states of the bistable devices is the code character being transmitted, even in the event of a single error in the character being transmitted. A source of bias 17 and its associated conductor 17*a* may be included to set the flux of core 20 at a negative four units, and an output winding 24 is included to produce an output signal on the occurrence of positive flux from core 20 to trigger four read-out signals corresponding to the information elements represented by the states of bistable devices stages 22*d* to 22*g* for coupling to utilization device 31 and to reset switching circuit 22 through counter 23*b* for the next input code group from source 5**.

The circuit of FIG. 4 reduces the amount of cores necessary to decode an $n$ element code; however, it is necessary that the rate of switching must be equal to or greater than $2^n$ times the rate at which the input signals are received. This means that pulse generator **23*a* must operate counter 23*b* at this rate, which may be undesirable when the code groups are transmitted at high speed, so FIG. 5 has been provided to illustrate how, by providing additional cores, the switching rate of the switching circuit may be decreased. As in FIG. 4, a source 5 of seven input signals is shown having seven output conductors 16*a* to 16*g*, with the exception that only conductors 16*b* to 16*g* are coupled to the parallel winding pairs 25*a* to 25m. One winding of each pair of parallel windings 25*a* to 25*m* are wound in clockwise fashion on cores 26 and 27 while the other winding of each pair is wound in counterclockwise fashion. Each winding pair terminates at a different one of the six binary devices of switching circuit 28. Conductor 16*a* is not coupled to a parallel winding pair, but is wound directly on core 26 in a counterclockwise fashion and on core 27 in a clockwise fashion. The input signal on conductor 16*a* represents an information element of the input code and will cause one type flux in core 26 and the opposite flux in core 27. Driving circuit 29 including pulse generator 29*a*, three stage binary counter 29*b*, and logic circuit 29*c* cooperates with switching circuit 28 to generate the latter six code element combinations for all the possible code characters, and these latter six elements are represented in the form of make or break circuits as described for switching circuit 22 of FIG. 4. Bias source 17 with associated conductor 17*a* and output winding 24 operate in the same manner as described in FIG. 4. Since conductor 16*a* carries an information signal, a read-out winding 30 for the element represented is provided, which with the read-out conductors from the remaining three information bistable elements, may be applied to a utilization device 32. It is seen that since counter 29*b* need only be three stage, the counting rate is one half that of counter 23*b* of FIG. 4. It is the addition of a second core that permits switching circuit 28 to operate at a rate which is half that of switching circuit 22** of FIG. 4. This principle can be extended to further reduce the switching rate. The next step would be a four core device with a switching circuit which operates at a rate one-fourth of that required for the single core embodiment, and so on until an $n$ core device without a switching circuit as described in FIG. 3 is reached.

FIGS. 2 to 5 illustrated several specific arrangements employing the principles embodied in FIG. 1 for the specific case of $n$ equal to seven. It is emphasized that the present invention may be employed as a code recognition device for any block error correcting codes of any length. The invention is not restricted to single error correction, but will operate in instances of double error and above provided the input code employs the minimal geometrical distances set forth in Table I.

While we have described above the principles of our invention in connection with specific apparatus, it is to be clearly understood that this description is made only by way of example and not as a limitation to the scope of our invention as set forth in the objects thereof and in the accompanying claims.

We claim:

1. An error handling arrangement for code recognition systems comprising a source of a plurality of discrete input signals wherein each input signal is characterized by any one of a plurality of possible signaling conditions such that at any one time the signaling conditions of said plurality of input signals are representative of any single one of a plurality of code groups, means responsive to said input signals to produce an analog output signal for a given one of said code groups and for others of said code groups which differ from said given code group due to an error in a predetermined number of said signaling conditions, and means coupled to said means responsive to recover the information of said given code group from said output signal.

2. A code recognition system comprising a source of a plurality of discrete input signals wherein each input signal is characterized by any one of a plurality of possible signaling conditions such that at any one time the signaling conditions of said plurality of input signals are representative of any single one of a plurality of code groups and where selected code groups which differ from each of the other code groups by at least a first predetermined number of signaling conditions are representative of code characters, means responsive to said input signals to produce an analog output signal for a given one of said code characters and for others of said code groups distinct from said given code character by a second predetermined number of signaling conditions, and means coupled to said responsive means to recover the information of said given code character from said output signal.

3. A code recognition system comprising a source of $n$ discrete input signals wherein each input signal is characterized by one or the other of two possible signaling conditions such that any one time the signaling conditions of said $n$ input signals are representative of any one of $2^n$ possible code groups, means responsive to said input signals to produce a predetermined analog signal for a given one of said code groups and for others of said code groups distinct from said given code group by a predetermined number of said signalling conditions, and means coupled to said means responsive to enable the utilization of said predetermined output signal to recover the information of said given code group and to reject output signals resulting from others of said code groups distinct from said given code group by a number of said signalling conditions exceeding said predetermined number.

4. A code recognition system comprising a source of $n$ discrete input signals wherein each input signal is characterized by one or the other of two possible signaling conditions such that at any one time the signaling conditions of said $n$ input signals are representative of any one of $2^n$ possible code groups, means including at least one magnetic core responsive to said input signals to produce an analog output signal for a given one of said code groups and for others of said code groups distinct from said given code group by a predetermined number of said signaling conditions, and means coupled to said means responsive to recover the information of said given code group from said output signal.

5. An error handling arrangement for code recognition systems comprising a source of $n$ discrete input signals wherein each input signal is characterized by one or the other of two possible signaling conditions such that at any one time the signaling conditions of said $n$ input signals are representative of any one of $2^n$ possible code groups of which $2^m$ of said code groups represent code characters, means responsive to said input signals to produce a corresponding one of $2^m$ analog output signals upon the reception of a given one of said $2^m$ code characters and for others of said code groups distinct from said given code character by a predetermined number of errors in said input signals, and means coupled to said means responsive to enable utilization of said $2^m$ output signals to recover the information of said given code character and to reject output signals resulting from others of said code groups distinct from said given code character by errors in said input signals exceeding said predetermined number of errors.

6. A code recognition system comprising a source of $n$ discrete input signals wherein each input signal is characterized by one or the other of two possible signaling conditions such that at any one time the signaling conditions of said $n$ input signals are representative of any one of $2^n$ possible code groups of which $2^m$ of said code groups represent code characters, each one of said code characters being separated from each of the other code characters by at least a minimum geometrical distance of $d$ signaling conditions, a plurality of translation devices responsive to said input signals to translate said input signals into analog signals representative of code characters, and means coupled to said translation devices to produce an output signal therefrom corresponding to a given code character upon the occurrence of said code character and all other groups of said input signals distinct from said given code character by a predetermined geometrical distance.

7. An error handling arrangement for code recognition systems comprising a source of $n$ discrete input signals wherein each input signal is characterized by one or the other of two possible signaling conditions such that at any one time the signaling conditions of said $n$ input signals are representative of any one of $2^n$ possible code groups of which $2^m$ of said code groups represent code characters, each one of said code characters being separated from each of the other code characters by at least a minimum geometrical distance of $d$ signaling conditions, at least one magnetic core device responsive to said input signals to translate said input signals into analog signals representative of code characters, and means coupled with said magnetic core devices to produce an output signal therefrom corresponding to a given code character upon the occurrence of said code character and for all other groups of said input signals which differ from said character due to an error in at least one of said input signals.

8. A code recognition system comprising a source of a plurality of discrete input signals wherein each input signal is characterized by any one of a plurality of possible signaling conditions such that at any one time the signaling conditions of said plurality of input signals are representative of any single one of a plurality of code groups wherein selected code groups differing from each of the other code groups by a first predetermined number of signaling conditions are represnetative of code characters, means responsive to said input signals to produce a plurality of output signals, each one of said output signals being representative of a separate one of said code characters, and means to cooperate with said responsive means to select the one of said output signals representative of a given code character upon the occurrence of said given code character and all code groups differing from said given code character by a second predetermined number of signaling conditions.

9. An error handling arrangements for code recognition systems comprising a source of $n$ discrete input signals wherein each input signal is characterized by one or the other of two possible signaling conditions such that at any one time the signaling conditions of said $n$ input signals are representative of any one of $2^n$ code groups of which $2^m$ of said code groups represent code characters, means responsive to said input signals to produce a plurality of output signals, each one representative of a separate one of said code characters, and means to cooperate with said means responsive to select the one of said output signals representative of a given code character upon the occurrence of said code character and all code groups differing from said code character due to an error in at least one of said input signals.

10. A code recognition system comprising a source of $n$ discrete input signals wherein each input signal is characterized by one or the other of two possible signaling conditions such that at any one time the signaling conditions of said $n$ input signals are representative of any one of $2n$ code groups of which $2^m$ of said code groups represent code characters, said code characters being separated from each of the other code characters by at least a minimum geometrical distance of $d$ signaling conditions, an arrangement of $2^m$ magnetic core devices, each device responsive to said input signals to produce an output signal corresponding to a different one of said code characters, and means to cooperate with said magnetic core devices to select the one of said output signals corresponding to a given code character upon the occurrence of said code character and all other groups of said input signals distinct from said given character by a predetermined geometrical distance.

11. A code recognition system comprising a source of $n$ discrete input signals, said $n$ input signals characterized by one or the other of two possible signaling conditions such that at any one time the signaling conditions of said $n$ input signals are representative of any one of $2^n$ possible code groups of which $2^m$ of said possible code groups represent code characters, $2^m$ magnetic cores, each one of said cores coupled in common to said source of input signals and to all of the other of said cores, and each core responsive to a different given one of said $2^m$ code characters to produce at least a first magnitude signal therefrom on the occurrence of said given code character with a predetermined number of elements in error and at most a second magnitude signal therefrom upon the occurrence of any of said other $2^n$ code groups, a source of bias signal coupled to each of said $2^m$ magnetic cores to bias said cores at a value intermediate said first magnitude and said second magnitude, and $2^m$ output means, each one of said output means coupled to one of said magnetic cores to produce a characteristic output signal therefrom upon the occurrence thereat of at least said first magnitude signal, each output signal being characteristic of each of said different code characters.

12. A code recognition system comprising a source of $n$ discrete input signals wherein each input signal is characterized by one or the other of two possible signaling conditions such that at any one time the signaling conditions of said $n$ input signals correspond to any one of $2^n$ possible code groups of which $2^m$ of said possible code groups represent code characters, means to generate a plurality of discrete signal combinations, each one corresponding to a separate one of said $2^m$ code characters, means responsive to said input signals and said plurality of signal combinations to compare said input signal code groups with each and every one of said $2^m$ code characters, and means to cooperate with said means responsive to produce an output signal whenever one of said generated code characters and one of said input signal code groups are identical in a predetermined number of signaling conditions.

13. A code recognition system comprising a source of $n$ discrete input signals wherein each input signal is characterized by one or the other of two possible signaling conditions such that at any one time the signaling conditions of said $n$ input signals correspond to any one of $2^n$ possible code groups of which $2^m$ of said possible code groups represent code characters, means responsive to said source capable of inverting the signaling conditions of said input signals, gating means coupled to said means responsive to cause said means responsive to sequentially invert the signaling conditions of different predetermined ones of said input signals, and means to cooperate with said means responsive to produce an output signal when at least a predetermined number of the signaling conditions thereat are in the same one of said two possible signaling conditions.

14. A code recognition system comprising a source of $n$ discrete input signals wherein each input signal is characterized by one or the other of two possible signaling conditions such that at any one time the signaling conditions of said $n$ input signals correspond to any one of $2^n$ possible code groups of which $2^m$ of said possible code groups represent code characters, a magnetic core, a source of bias signal coupled to said core, $n$ pairs of windings arranged on said core, one end of said pairs of windings coupled to said input signal source, an $n$ stage binary counter, each of said stages coupled respectively to the other end of said $n$ pairs of windings, means coupled to said binary counter to cause said binary counter stages to sequentially gate said input signals through said windings to produce signal combinations representative of said $2^m$ code characters, and output means coupled to said magnetic core and said binary counter to produce an output signal when the code combinations produced by said binary counter and those produced by said input signals agree in at least a predetermined number of binary elements.

15. A decoding device responsive to a given code character of an error-correcting binary code comprising a source of $n$ discrete error-correcting binary code signals, $n$ means responsive, each means being responsive to a separate one of said input signals to produce a first signaling condition when said separate input signal represents the corresponding element of said given code character and an opposite type signal when said separate input signal does not so represent said corresponding element, means coupled in common to said $n$ means responsive to summate the output signals therefrom, and means coupled to said means to summate to produce an output signal when said first signaling conditions exceed said opposite type signaling conditions by a predetermined amount.

16. A decoding device responsive to a given code character of an error-correcting binary code comprising a source of $n$ discrete error-correcting binary code signals, $n$ means responsive, each means being responsive to a separate one of said input signals to produce a first signaling condition when said separate input signal represents the corresponding element of said given code character and an opposite type signal when said separate input signal does not so represent said corresponding element, means coupled in common to said $n$ means responsive to summate the output signals therefrom, and means coupled to said means to summate to produce an output signal upon the occurrence of at least $n-2$ of said first signaling conditions.

17. A code recognition system comprising a source of $n$ discrete input signals wherein each input signal is characterized by one or the other of two possible signaling conditions such that at any one time the signaling conditions of said $n$ input signals are representative of any one of $2^n$ code groups of which $2^m$ of said code groups represent code characters, a source of bias signal, a magnetic core biased at a predetermined value responsive to said input signals to produce an output signal upon the occurrence of a selected one of said $2^m$ code characters and for all of said code groups distinct from said selected code character by a predetermined number of signaling conditions.

18. A code recognition system comprising a source of $n$ discrete input signals wherein each input signal is characterized by one or the other of two possible signaling conditions such that at any one time the signaling conditions of said $n$ input signals are representative of any one of $2^n$ possible code groups of which $2^m$ of said possible code groups represent code characters separated by at least a geometrical distance of $d$, where $d$ is an odd number, a magnetic core, $n$ windings coupling said source of signals to said magnetic core, each of said windings coupling a separate one of said signals and wound on said core in one or the other of two possible winding arrangements, said $n$ windings producing $n$ units of positive flux in response to a given input signal code character, $n-d+1$ units of positive flux in response to said given code character with at most $$\frac{d-1}{2}$$

errors, and at most $n-d-1$ units of positive flux in response to any other of said $2^n$ code groups, a source of bias signal coupled to said core to produce $n-d$ units of negative flux, and an output winding coupled to said core to produce an output signal upon the occurrence of positive flux in said core.

19. A code recognition system comprising a source of $n$ discrete input signals wherein each input signal is characterized by one or the other of two possible signaling conditions such that at any one time the signaling conditions of said $n$ input signals are representative of any one of $2^n$ possible code groups of which $2^m$ of said possible code groups represent code characters separated by at least a geometrical distance of $d$, where $d$ is an even number, a magnetic core, $n$ windings coupling said source of signals to said magnetic core, each of said windings coupling a separate one of said signals and wound on said core in one or the other of two possible winding arrangements, said $n$ windings producing $n$ units of positive flux in response to a given input signal code character, $(n-d+2)$ units of positive flux in response to said given code character with at most $$\frac{(d-1)}{2}$$

errors, and at most $n-d-2$ units of positive flux in response to any other of said $2^m$ code groups with at most $$\frac{(d-1)}{2}$$

errors, and $n-d$ units of positive flux in response to any of said $2^m$ code groups with exactly $d/2$ errors, a source of bias signal coupled to said core to produce $n-d$ units of negative flux, and an output winding coupled to said core to produce an output signal upon the occurrence of positive flux in said core.

20. A code recignition system comprising a source of $n$ discrete input signals wherein each input signal is characterized by one or the other of two possible signaling conditions such that at any one time the signaling conditions of said $n$ input signals are representative of any one of $2^n$ possible code groups of which $2^m$ of said possible code groups represent code characters separated by at least a geometrical distance of $d$, $2^m$ magnetic cores, $n$ windings coupling said source of signals to said $2^m$ magnetic cores, each of said windings coupling a separate one of said signals and wound on each of said cores in one or the other of two possible winding arrangements so that each one of said cores is wound to produce $n$ units of positive flux upon the occurrence of a corresponding one of said $2^m$ code characters, $n-d+1$ units of positive flux upon the occurrence of a corresponding one of said $2^m$ code characters with a single element error, and at most $n-d-1$ units of positive flux in response to any other of said $2^n$ code groups, a source of bias signal coupled to each of said cores to produce $n-d$ units of negative flux in each of said cores, and $m$ output windings, each of said output windings coupled to selected ones said cores to produce an output signal upon the occurrence of positive flux, the output signals of said $m$ windings representing the code character corresponding to the core having the positive flux.

21. A code recognition system comprising a source of $n$ discrete input signals wherein each input signal is characterized by one or the other of two possible signaling conditions such that at any one time the signaling conditions of said $n$ input signals correspond to any one of $2^n$ possible code groups of which $2^m$ of said possible code groups represent code characters separated by at least a geometrical distance of $d$, a magnetic core having $n$ pairs of windings with one of the windings of each pair wound opposite to the other winding and each of said pairs of windings coupled to a separate one of said input signals of said source, a switching means including $n$ bistable switches, each of said $n$ switches coupled to a separate one of said $n$ winding pairs, control means coupled to said switches to control the operation of said switches to permit said input signals to flow in one or the other of said windings of said winding pairs, said control means including a binary counter, a pulse generator to drive said binary counter, and a logic circuit coupled to said binary counter output to produce a plurality of control signals which operate said bistable switches so said bistable switches are sequentially positioned to represent each of said $2^m$ code characters, and output means coupled to said magnetic core to produce an output signal when the code character represented by said bistable switches and the code group represented by said input signals correspond in a predetermined number of elements.

22. A double-ended bilateral code handling system comprising a first terminal circuit at one end of said system and a second terminal circuit at the other end of said system, a source of a plurality of discrete input signals selectively coupled to said first terminal circuit wherein each input signal is characterized by any one of a plurality of possible signaling conditions such that at any one time the signaling conditions of said plurality of input signals are representative of any one of a plurality of error-correcting code groups, means coupled to said first and second terminal circuits responsive to said input signals to produce a plurality of discrete output signals at said second terminal circuit for a given one of said code groups and for all other groups of said input signals distinct from said given code group by a predetermined number of signaling conditions, a first utilization means selectively coupled to said second terminal circuit responsive to said output signal, a second source of discrete input signals selectively coupled to said second terminal circuit to cause said means coupled to said first and second terminal circuit to produce a plurality of discrete output signals at said first terminal circuit wherein each output signal thereat is characterized by any one of a plurality of possible signaling conditions such that at any one time the signaling conditions of said plurality of output signals are representative of any one of a plurality of error-correcting code groups, and second utilization means selectively coupled to said first terminal circuit responsive to said plurality of output signals.

References Cited by the Examiner

UNITED STATES PATENTS

| | | | |
|---|---|---|---|
| 2,552,629 | 5/1951 | Hamming et al. | 340—147 |
| 2,691,152 | 10/1954 | Stuart-Williams | 340—147 |
| 2,691,153 | 10/1954 | Rajchman et al. | 340—184 X |
| 2,719,962 | 10/1955 | Karnaugh | 340—147 |
| 2,733,860 | 2/1956 | Rajchman | 340—174 X |
| 2,920,317 | 1/1960 | Mallery | 340—174 |
| 2,968,030 | 1/1961 | Crane | 340—174 |

OTHER REFERENCES

Elias, Peter: "Coding for Noisy Channels," IRE Convention Record, Part 4, pages 37–46, 1955.

Constantine, Jr., Gregory: Memory Address Checking; IBM Technical Disclosure Bulletin, vol. 1, No. 2, page 14, August 1958.

Green, James H., et al.: "A Digital Selective Signaling System for Mobile Radio," IRE Transactions on Vehicular Communications, pages 74–85, April 1959.

Saxenmeyer, G. J.: Checking Circuit, IBM Technical Disclosure Bulletin, vol. 2, No. 2, page 11, August 1959.

ROBERT C. BAILEY, *Primary Examiner.*

EVERETT R. REYNOLDS, JOHN F. BURNS, MALCOLM A. MORRISON, *Examiner.*

F. G. NIEMAN, K. E. JACOBS, M. J. SPIVAK, *Assistant Examiners.*